United States Patent [19]
Haynes et al.

[11] Patent Number: 5,428,734
[45] Date of Patent: Jun. 27, 1995

[54] METHOD AND APPARATUS FOR ENHANCING DRAG AND DROP MANIPULATION OF OBJECTS IN A GRAPHICAL USER INTERFACE

[75] Inventors: Thom R. Haynes, Euless; Daryl J. Kahl, Flower Mound; Lovie A. Melkus, Southlake; David J. Schell, Trophy Club, all of Tex.

[73] Assignee: IBM Corporation, Roanoke, Tex.

[21] Appl. No.: 995,235

[22] Filed: Dec. 22, 1992

[51] Int. Cl.⁶ .............................................. G06F 3/00
[52] U.S. Cl. .................................................. 395/159
[58] Field of Search ..................... 395/155, 157, 159; 364/200; 345/117–118

[56] References Cited

U.S. PATENT DOCUMENTS 4,984,152  1/1991  Muller ................................. 364/200

OTHER PUBLICATIONS

Research Disclosure 34146, "Direct Manipulation Stapler Icon," Sep. 10, 1992, p. 712.
Gookin, Dan, "New Wave, Desktop enhance Windows", Infoworld, May 11, 1992, pp. 63, 66, 70, 74, 78, 79, 80.
Microsoft Corporation, *Microsoft Windows User's Guide* v.3.0, 1985–1990, pp. 134–135.
Cohen, Raines, "7.1 done, ships to users Oct. 19," MacWeek Sep. 14, 1992 v6 n32 P1(2).

*Primary Examiner*—Mark R. Powell
*Assistant Examiner*—Robert Andrews
*Attorney, Agent, or Firm*—Gunn & Associates

[57] ABSTRACT

A method and apparatus provide a direct manipulation protocol to allow a user, while dragging a source object to a target object, to pass the source object through one or more intervening processor objects, causing an appropriate action to occur to the source object when it is dropped on the target object. If the source object is passed across a processor object for which no appropriate action occurs, the source object remains unchanged in appearance and content. If the source object undergoes modification, its graphical representation to the user changes, giving the user feedback that the source object has been modified.

9 Claims, 11 Drawing Sheets

METHOD AND APPARATUS FOR ENHANCING DRAG AND DROP MANIPULATION OF OBJECTS IN A GRAPHICAL USER INTERFACE

FIELD OF THE INVENTION

This invention relates to a graphical user interface (GUI), and more particularly, to a direct manipulation technique where drag and drop operations are modified to specify user-defined actions on an object.

BACKGROUND OF THE INVENTION

Enhancing visual feedback and interaction between computer users and their machines is a major reason for the growth and acceptance of graphical-user-interfaces (GUIs). Computer users have benefited from the elimination of multiple keystrokes required to accomplish tasks in keyboard based systems. Graphical user interfaces exploit the powerful capabilities of direct manipulation (e.g., a set of standard techniques that let a user handle electronic objects in ways similar to the way corresponding objects are handled in the physical world). Direct manipulation is the electronic procedure of directly applying one or more actions to an object. For example, a user wishing to print a document in a GUI can, with a mouse or other pointing device, drag an icon representing the document (the source object) to an icon representing a printer (the target object), and drop the document icon on the printer to print the document. Similarly, the user wishing to place an electronic document in a particular file, may drag the electronic document icon (the source object) to a file folder icon (the target object) and drop it thereon, causing the electronic document to be appropriately filed. While the above described direct manipulation protocol allows multiple actions to be combined into a single drag/drop operation, the protocol suffers when the user needs to specify a series of user-defined actions on a single object. Users are restricted to standard actions within the GUI and are not allowed to augment or modify the standard operations provided by the GUI designers. Users are thus restricted to altering the source object or the target object when alterations are needed. For example, if a user wanted to print a document after removing embedded formatting tags (i.e., characters attached to a set of data containing information about the set), a series of steps would be required. First, the user needs to perform an <EDIT> operation on the document to remove the embedded tags. The edited document could then be dragged to a printer icon to perform the print operation. There is no known procedure or apparatus that provides a user with the above described edit and print capability in a single continuous drag/drop operation. Additionally, GUI users should have the capability of defining at the time an action is taken whether warning messages should be displayed. A direct manipulation procedure is needed that will allow experienced computer users to suppress confirmation messages. Experienced users should be allowed to perform risky actions (i.e. DELETE, SHRED, etc) without augmentation keys or options settings to turn confirmation messages off.

Consequently, a technique is needed that provides users with a procedure for augmenting or modifying the standard operations provided by system designers of graphical user interfaces.

SUMMARY OF THE INVENTION

This invention relates to a method and apparatus for extending the basic direct manipulation protocol to allow a user, while dragging a source object to a target object, to pass the source object through one or more intervening objects, causing an appropriate action to occur at the target object. If the source object is passed across an object for which no appropriate action occurs, the source object would remain unchanged in appearance and content. If, however, the source object undergoes a modification, its graphical representation to the user would change, giving the user feedback that the source had been modified. The source object could dynamically change to show a number associated with the number of changes that has occurred to it on its route from source location to target location. Other feedback possibilities may be provided including flashing the object or color changes.

DETAILED DESCRIPTION

Figure 1:
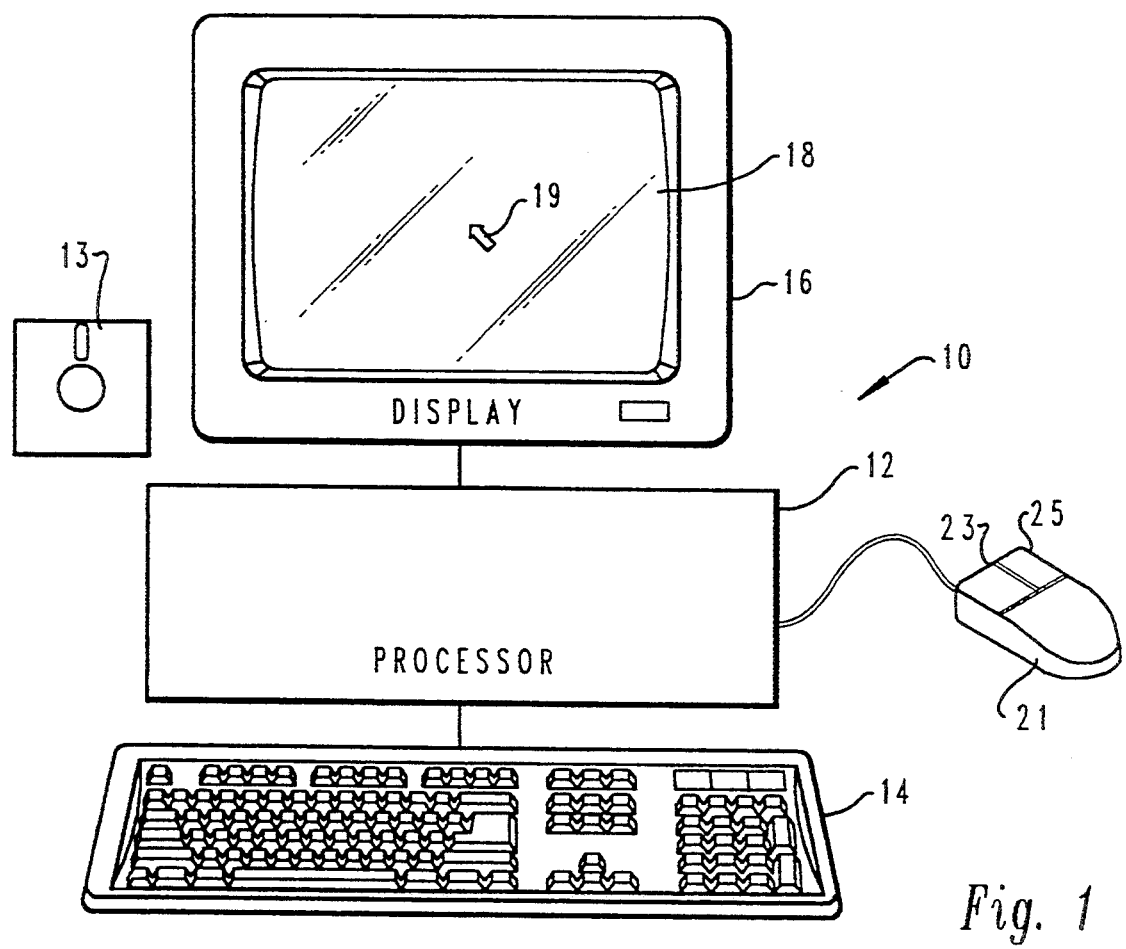
FIG. 1 is a pictorial representation of a data processing system where this invention may be practiced.

With reference now to the figures, and in particular FIG. 1, there is depicted a pictorial representation of a data processing system 10 that may be used to carry out the method and apparatus of this invention. Data processing system 10 includes a processor 12 (with an internal central processing unit, read only memory, and random access memory, which are not shown but well known to those skilled in the art) which is coupled to a keyboard 14 and a display monitor 16 in a manner well known in the art. Processor 12 is adapted to receive removable storage media such as diskette 13, which may contain an application program, data, or other software. Those skilled in the art will recognize that data processing system 10 may be implemented by using any suitable computer, including a personal computer or a workstation coupled to a host computer. One example of a data processing system that may be used to implement the method and apparatus of the present invention is the IBM PERSONAL SYSTEM/2 (PS/2) computer which is manufactured by the IBM Corporation.

Still referring to FIG. 1, display screen 18 has displayed thereon a pointer/cursor 19 that is used in a manner well known in the art to indicate a selected position upon the computer display screen 18. Pointer 19 may be moved about the computer display screen 18 by moving a pointing device such as mouse 21, as is well known in the art. In the preferred embodiment, mouse 21 includes at least two buttons, including mouse button number one which is designated by the numeral 23 and mouse button number two which is designated by numeral 25.

Figure 2:
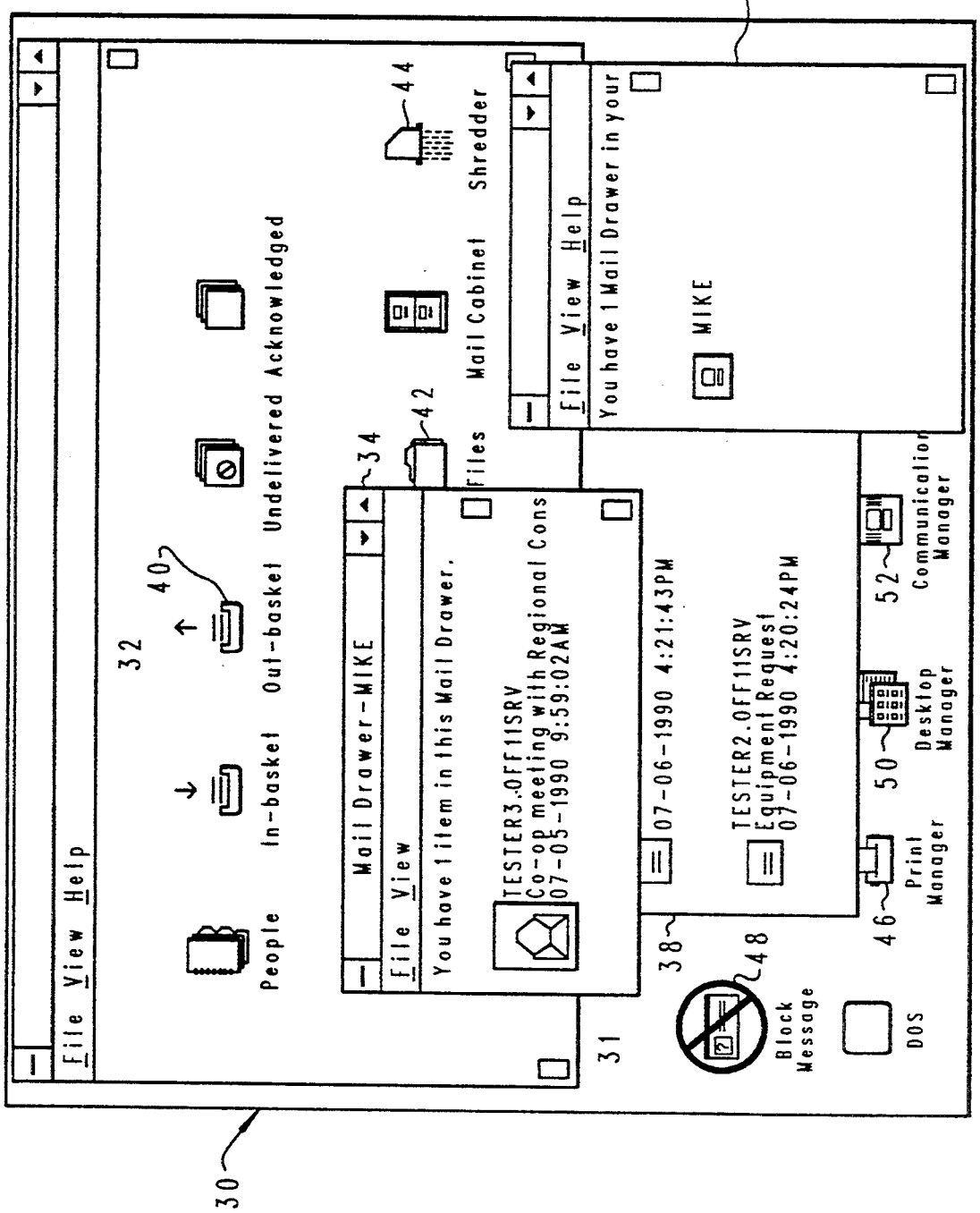
FIGS. 2 and 3 show graphical user interface (GUI) images displayed on the data processing system of FIG. 1.

Turning now to FIG. 2, a window 30 or "Work Desk" is shown displayed on a computer display screen such as screen 18 of FIG. 1. Window 30 includes a plurality of overlapping open windows 31, 32, 34, 36 and 38. Window 32 contains a plurality of icons representing operations available to a user including an out-basket icon 40 (for a user's out-going mail), a shredder icon 44 (for destroying unwanted items), and files icon 42 (containing data and information accessible by the user). Open windows 34, 36, and 38 are informational windows containing data about objects on the work desk. Window 31 also contains a plurality of icons representing application programs which may be invoked by double-clicking on the appropriate icon. More particularly, there is shown a communication manager icon 52 (for establishing communication with a host or other networked machine), a desktop manager icon 50 (for specifying the application programs to appear in the window), a print manager icon 46 (for printer control), and a block message icon 48 (for modifying message presentation as explained later in this specification). One example of a program capable of generating window 30 is the IBM OPERATING SYSTEM/2 (OS/2) program which is manufactured by the IBM Corporation.

Figure 4:
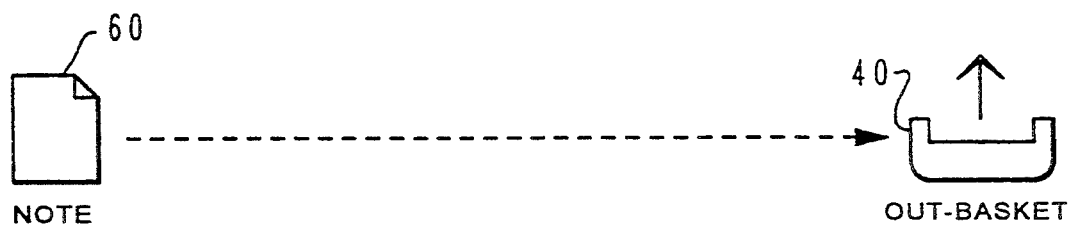
FIG. 4 shows individual icons representing objects in a graphical user interface as practiced in the prior art.

Turning now to FIG. 4, there is shown direct manipulation of icons as practiced in the prior art. The note 60 represents data the user wishes to place in an out-basket 40 for delivery to another user. To accomplish the operation, a user positions the pointer/cursor 19 over note 60 using mouse 21 (FIG. 1). Note 60 is then attached to pointer 19 and is dragged to and dropped upon out-basket 40. Drag and drop direct manipulation techniques are well known in the art as described in patent application Ser. No. 07/808,858, filed Dec. 17, 1991, which is assigned to the assignee of the present invention and incorporated herein by reference. The note 60 object is alternatively called a source object and out-basket 40 object is called a target object. As practiced in the prior art, a user is limited to the delivery schedule provided by the GUI designer. A user wishing to stipulate a delivery time different from the current time would have some onerous decisions to make. For example, if the user wishes to mall note 60 at 3 AM instead of the current time, the user would have to plan ahead to arrive at the office before 3 AM to mail the note. Therefore, the user is limited to the standard operation provided by the GUI designer, namely, mailing all notes placed in out-basket 40 at the current time.

Figure 5:
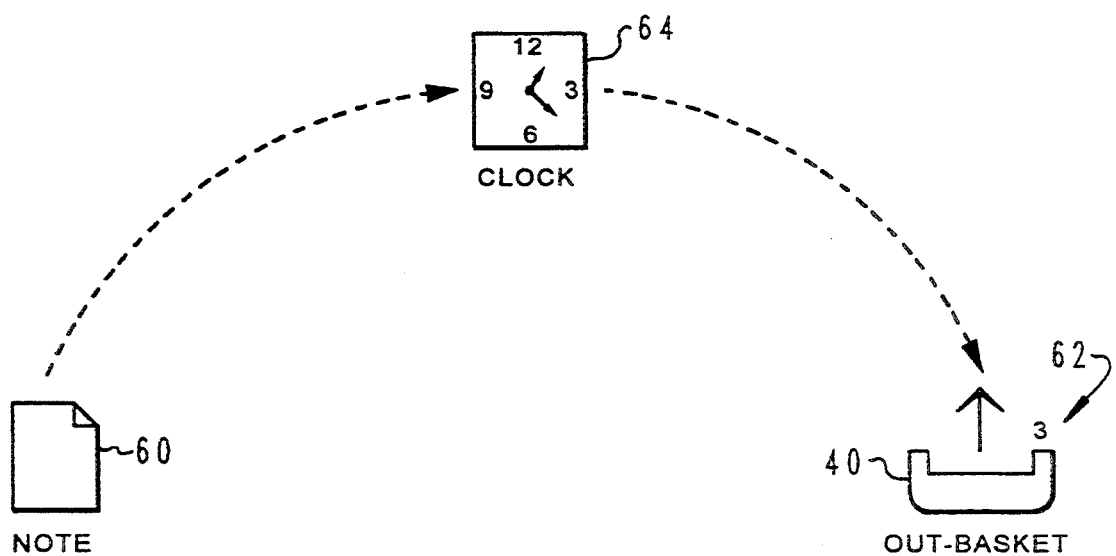
FIGS. 5-7 show manipulation of icons to augment-/modify operations in a graphical user interface as disclosed by this invention.
Figure 5:
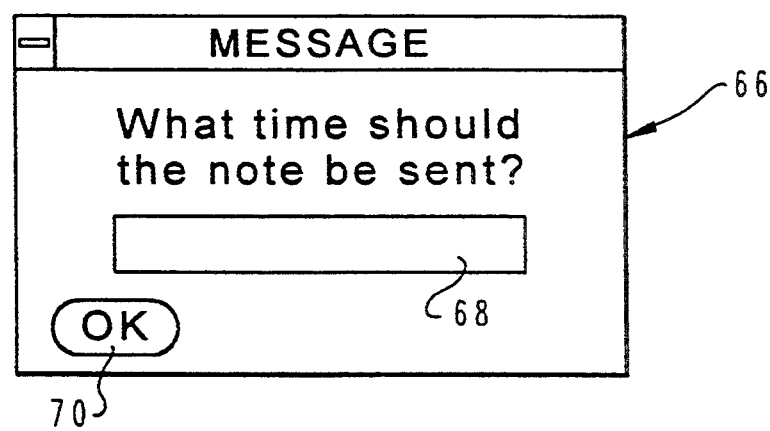

Turning now to FIG. 5, an example of a procedure is shown that provides augmentation/modification of the standard operation normally provided to a user. A clock 64 object is added to the work desk and displayed in one of the windows. The user wishing to mail a note at 3 AM, attaches note 60 to pointer 19 and drags note 60 through/across the clock 64 object and drops it on out-basket 40. Dropping note 60 onto out-basket 40 causes a pop-up 66 to appear. Pop-up 66 allows the user to specify the exact time note 60 is to be sent. The user inputs the time in time slot 68, and thereafter presses the <OK>70 button to enter the time. A counter 62 may be maintained at out-basket 40 indicating the number of notes contained therein. The added capability whereby the source object (note 60) is permitted to pass through an intervening object (clock 64) before dropping on the target object (out-basket 40) allows the GUI user to describe in more definite terms just what the direct manipulation operation should accomplish.

Figure 6:
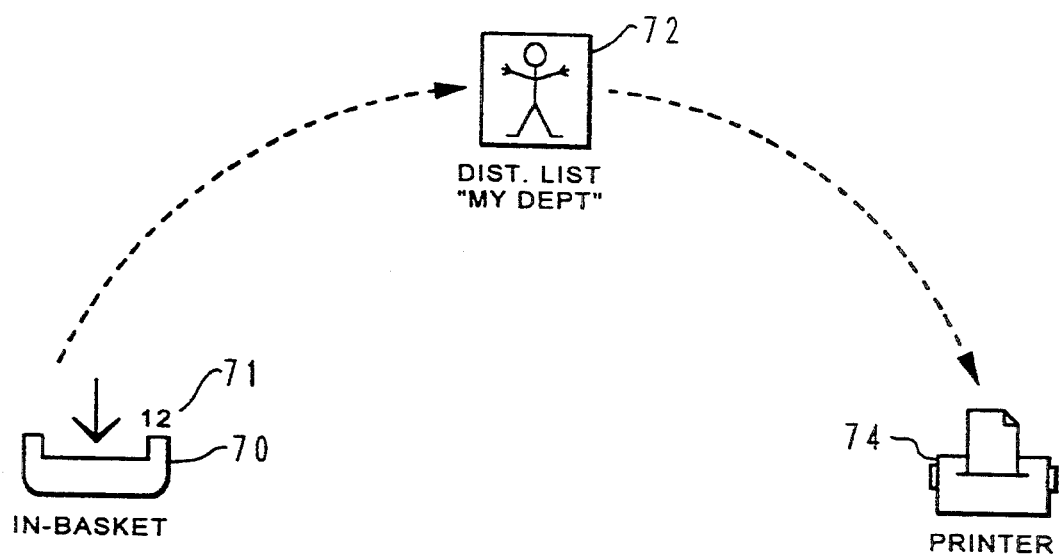

With reference to FIG. 6, another example is shown for extending modifiable direct manipulation functions to a GUI user. A user's in-basket 70 contains 12 notes as indicated by counter 71. The user wishes to print only the notes in the in-basket sent by members of the user's department. A "Distribution List of My Department" 72 object is provided containing the names of members of the user's department. The user drags in-basket 70 over distribution list 72 representing the department, and drops it on printer 74 to accomplish the desired operation. One skilled in the art recognizes that the "distribution list object" may be expanded to include any desired filter object including, for example, "all managers" or "only those with a certain security clearance".

Figure 7:
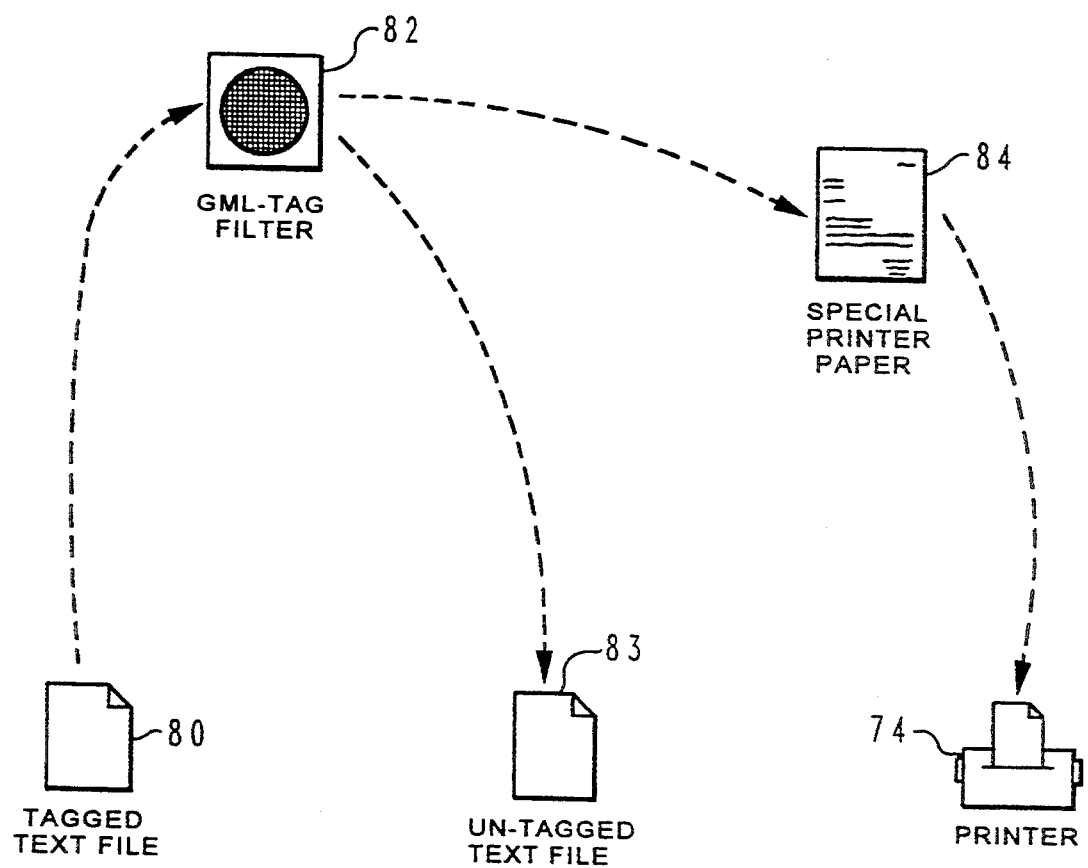

Turning now to FIG. 7, still another example is shown for augmenting the direct manipulation functions available to a GUI user. A user wishes to print tagged/formatted text file 80 with the embedded tags removed. The user would also like to print the document on special printer paper. A GML (Generalized Mark-up Language) filter 82 object is provided along with a special printer paper 84 object. The user passes tagged text file 80 through GML tag filter 82 object, to remove the embedded tags. The drag operation continues across the special printer paper 84 object and the text file 80 is dropped on the printer 74 object. In this manner, a user can set up a print Job with one direct manipulation operation. When the user's print Job queues to the front, the user will be prompted by the printer to supply the special paper. The present invention is also capable of creating an un-tagged text file 83. This may be accomplished by dragging tagged text file 80 through GML tag filter 82 and dropping it within empty space on the work desk to create a document without tags (un-tagged text file 83).

Figure 3:
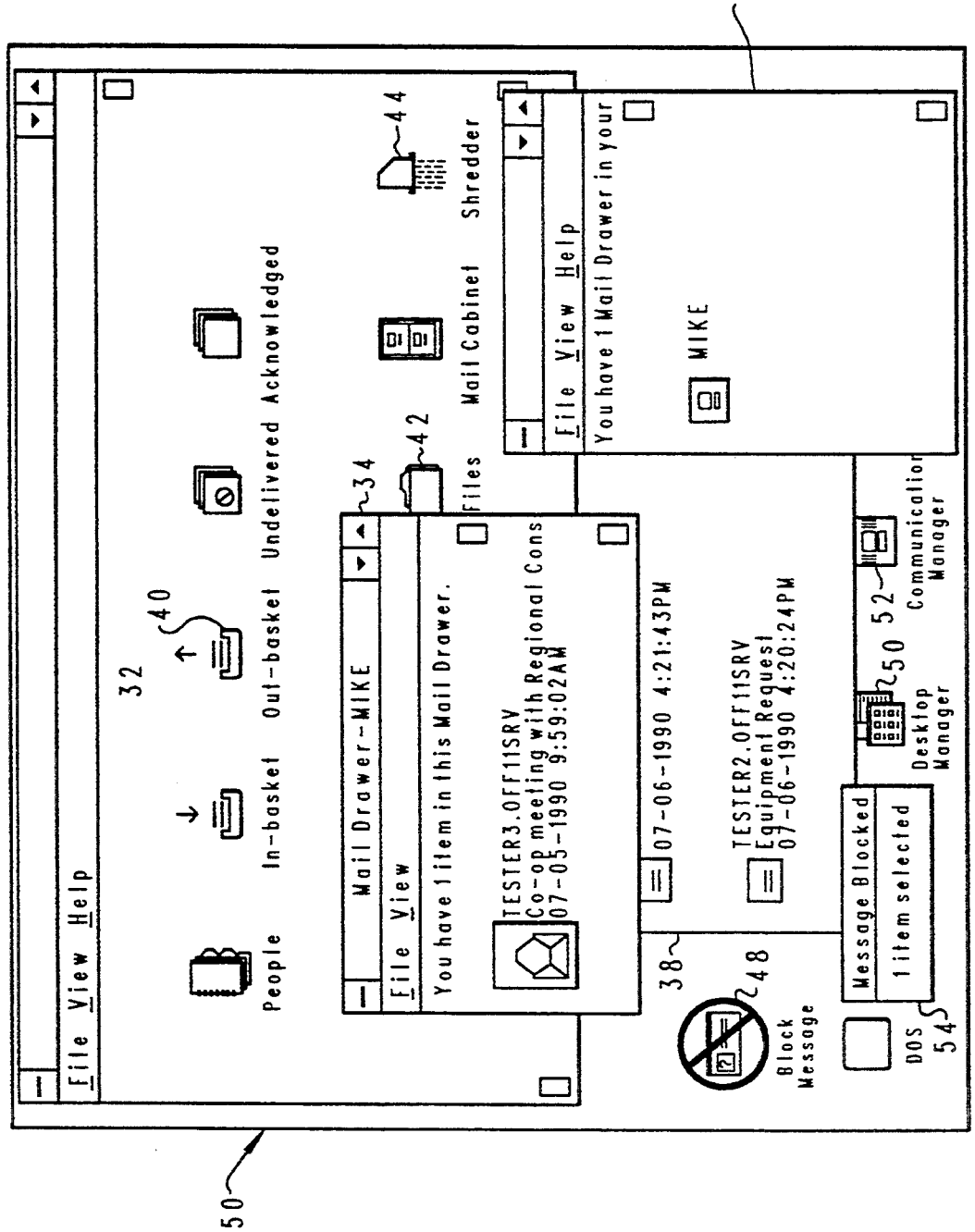

Turning again to FIG. 2, the invention may be used by experienced users to eliminate annoying confirmation dialogs when objects are removed or deleted from the work desk. Users are provided with the capability of specifying the appearance of the confirmation message during the process of selecting an action. The metaphor used is a barrier object which blocks the messages in a manner similar to the barriers in the physical world used to limit access to switches on guns or child-proof caps to keep children from pharmaceuticals. The barrier is provided to allow a user to perform risky operations (i.e., DELETE) which normally require the user to interact with a confirmation message. When the user wishes to perform an action which would ordinarily require interaction with a confirmation message, the user selects the object, drags it through a "barrier" object before dropping it on the appropriate action object (e.g., shredder). As the user drags the object over the barrier icon, a message may be displayed indicating the scope of the selected object (e.g., number of files, size of files, etc.). With particular reference to FIG. 2, a barrier object in the form of a Block Message 48 object is provided. A user wishing to print all documents in out-basket 40 without incurring printer messages, selects out-basket 40 and drags it through the Block Message 48 object and drops it on print manager 46 object. Turning to FIG. 3, all messages from the printer are blocked with an indication to the user as to what is taking place as shown in the Message Blocked 54 indicator which now overlays the previously displayed print manager 46 in FIG. 2.

As disclosed, this invention eliminates a major limitation of graphical user interfaces by allowing the user to describe in more definite terms just what the direct manipulation operation should do. This invention lessens time-consuming intermediate steps and allows a user to perform more exacting drag-and-drop operations. At the same time, ease-of-use is maintained along with the metaphorical power of direct manipulation.

Figure 8:
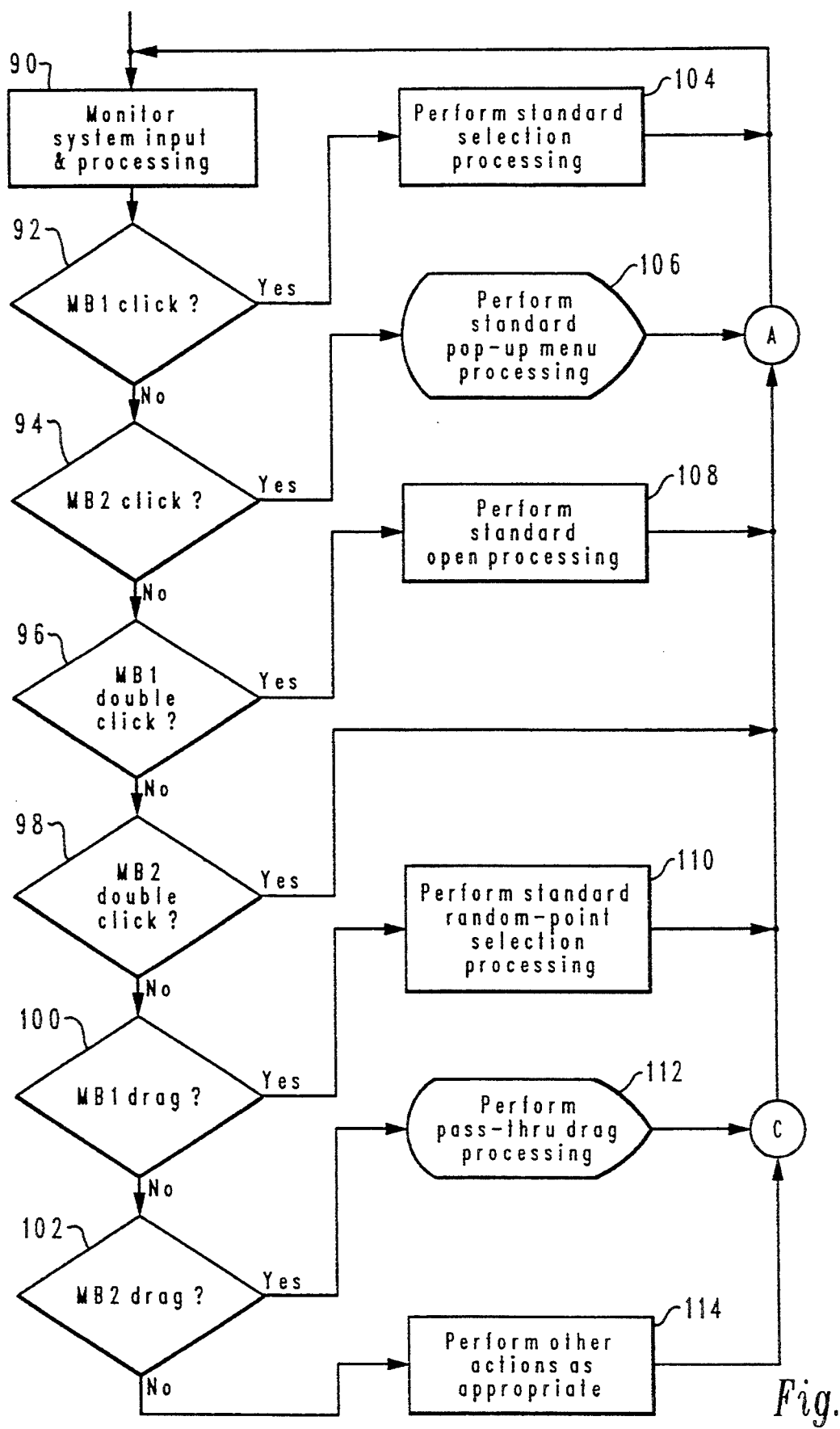
FIGS. 8-13 show flow diagrams of data processing procedures required to provide users with a capability to augment/modify standard actions in a graphical user interface.

Turning now to FIG. 8, a flow diagram is shown describing the operation of the invention when pass-through drag operations are provided. Processing begins at block 90 where the data processing system is monitoring system inputs and processes. At block 92, upon the occurrence of a mouse button one click, the system performs standard selection processing per block 104 and when completed, control is returned to the monitoring state as shown at block 90. Returning to block 92, if mouse button one has not been clicked, the system checks at block 94 for a mouse button two depression. If a click has been detected as a result of mouse button two depression, the system performs standard pop-up menu processing per block 106. Returning block 94, if a single click has not been detected for either mouse button one or mouse button two, the system determines if mouse button one has been double-clicked. If a double click is detected, the system performs standard open processing as indicated at block 108. Else, the procedure proceeds to block 98 where mouse button two is queried for double click depressions. Detection of double click depressions at mouse button two causes no operation to be performed and the system returns to a monitoring state per block 90. Returning to block 98, if double click depressions have not occurred from either mouse button, then processing continues to block 100 where the system checks for a mouse button one drag operation. If a drag operation has been initiated, processing continues to block 110 where the system performs standard random-point selection processing (i.e., moving a source object to a target object). Returning to block 100, if a mouse button one drag is not detected, the system checks for a mouse button two drag operation at block 102. Detection of a mouse button two drag operation causes the system to perform pass-through drag processing as previously described. Else, the system performs other actions as appropriate as indicated in block 114 and control returns to the monitoring state at block 90.

Figure 9:
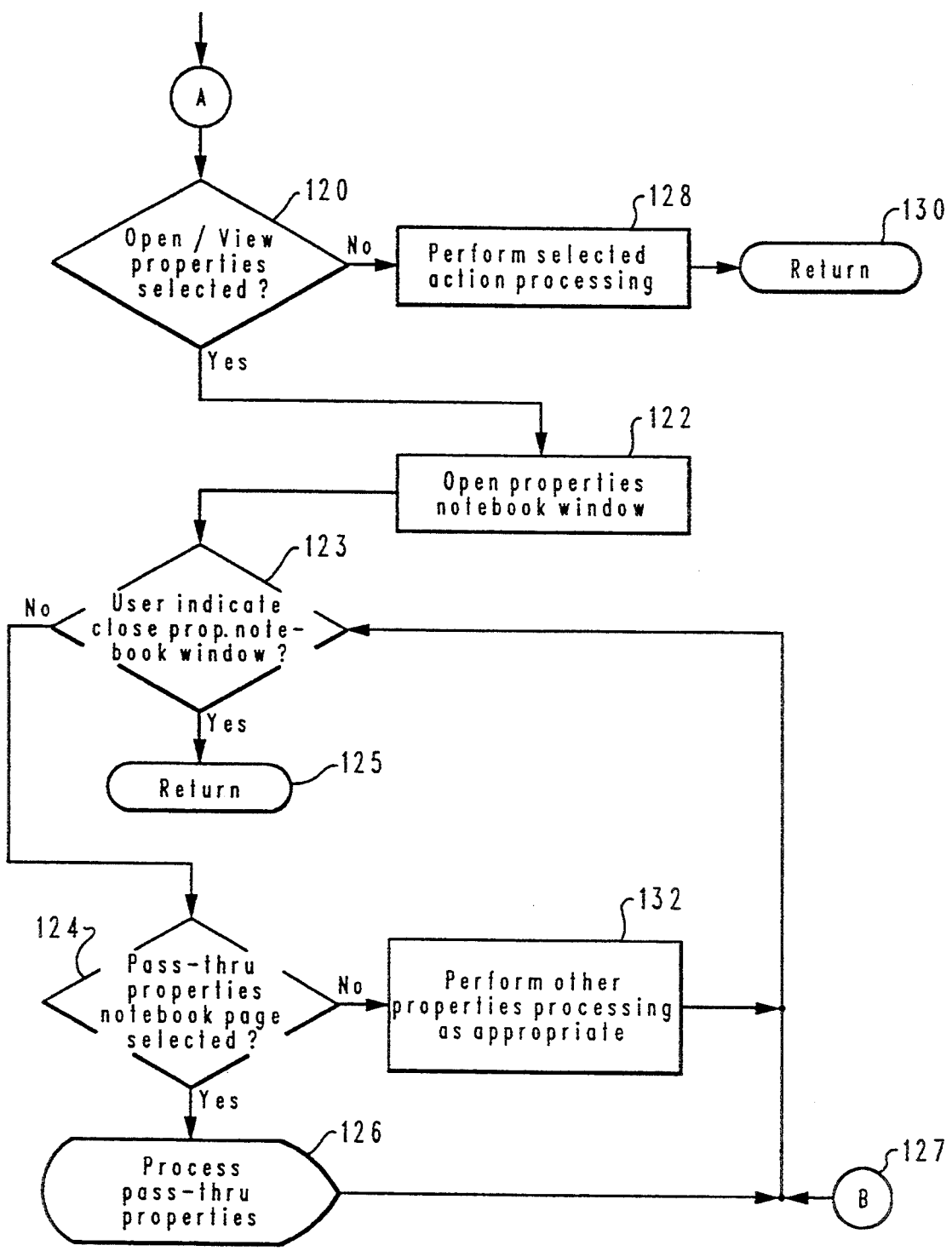

Turning now to FIG. 9, a flow diagram is shown describing the operation of the invention when standard pop-up menu processing is carried out. At block 120, the system checks to determine if a open/view properties selection has been made. If yes, the system opens the properties/settings notebook window as shown at block 122. Else, processing continues at block 128 where the system performs the selected action processing and returns control via block 130 to the system monitoring flow described in FIG. 8. Returning to block 122, after opening the properties window, the procedure proceeds to block 123 where the procedure checks to see if the user indicated that the properties notebook window should be closed. If YES, the procedure executes a return at block 125. Else, at block 124 a determination is made whether the pass-through properties notebook page is selected. If yes, processing continues at block 126 where the system processes pass-through properties. Else, the system performs the other properties processing as appropriate per block 132.

Figure 10:
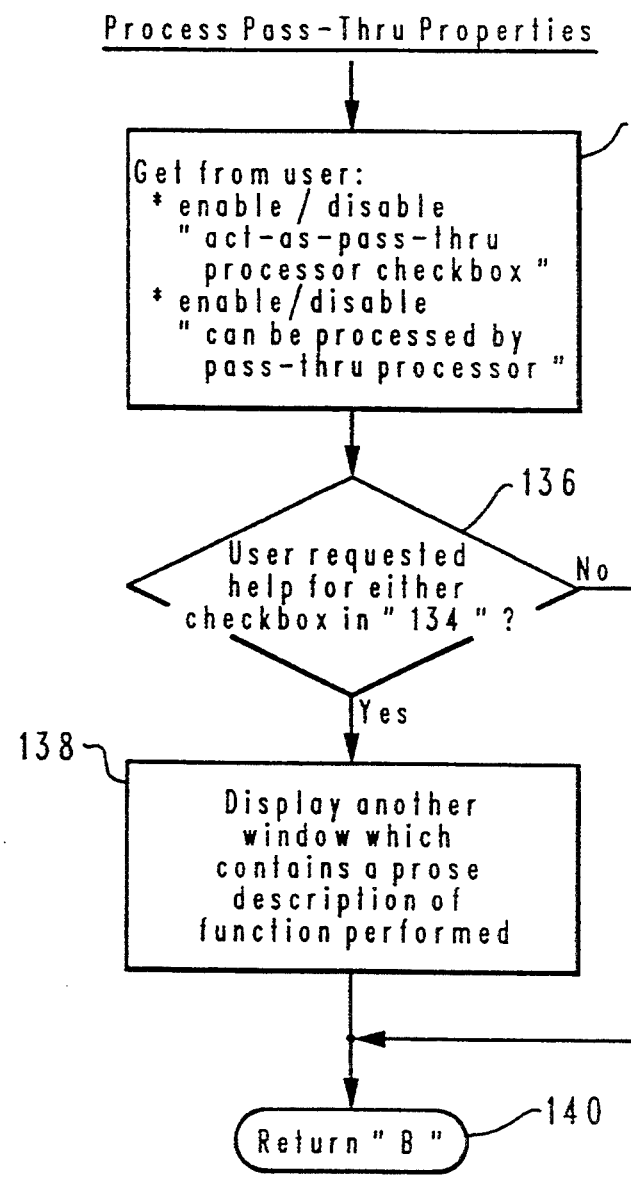

Turning now to FIG. 10, a flow diagram is shown describing details of the invention when the system processes pass-through properties. Block 134 shows the information supplied by the user for a particular object. The user must enable/disable the act-as-pass-through processor check box. The user may also indicate whether an object can be processed by the pass-through processor by checking the appropriate enable/disable box. At block 136, the system determines if the user requested HELP for either check box of block 134. If HELP has been requested, at block 138 the system displays another window which contains a prose description of the function performed. Else, processing continues at connector B 127 of FIG. 8.

Figure 11:
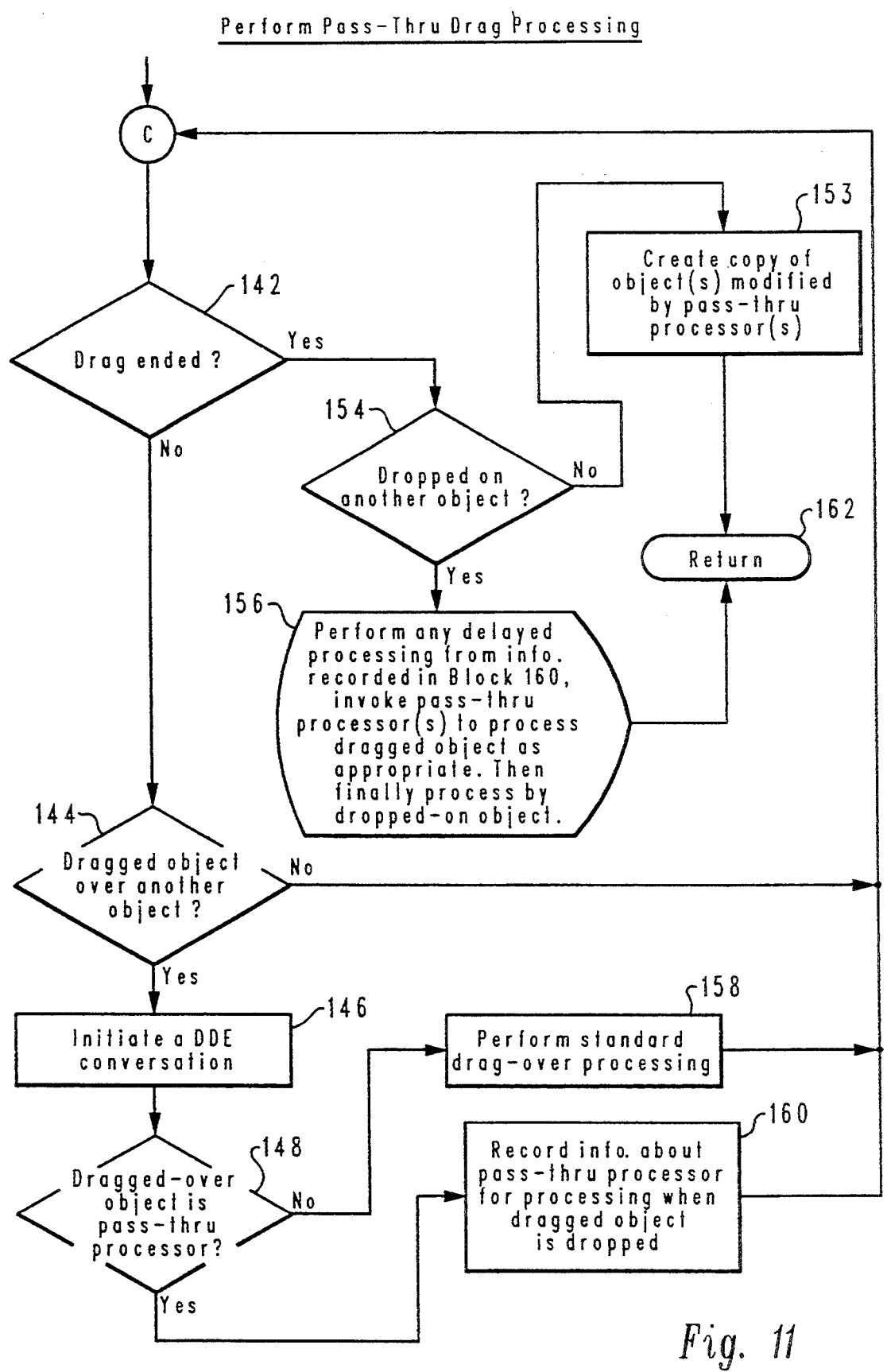

With reference now to FIG. 11, there is shown a flow diagram for performing pass-through drag processing using the present invention. Processing begins at block 142 where the system determines if a drag operation has ended. If yes, processing continues at block 154 where the system checks to see if a source object has been dropped on a target object. If the source object has been dropped on the target object, the system performs any delayed processing as shown at block 156 (i.e., process the dialogs for time entry) and exits the procedure at block 162. Returning to block 154, if NO, the procedure may create a copy of any objects modified by pass-through processors. One skilled in the art will appreciate that the present invention may be implemented such that dragging tagged text file 80 through the immediate processor 82 may cause the original text file 80 to be destroyed and replaced only by modified copy 83. Returning to block 142, if the system determines that the drag operation has not ended, the system checks to see if the source has been dragged over another object at block 144. If yes, a DDE (Dynamic Data Exchange) conversation is initiated at block 146. At block 148, the system checks to see if the dragged-over object is a pass-through processor. If yes, at block 160, information is recorded about the pass-through processor for processing when the dragged object is dropped. Returning to block 148, if the dragged over object is not a pass-through processor, processing continues at block 158 where the system performs standard drag-over processing. (i.e. graying, shadowing).

Figure 12:
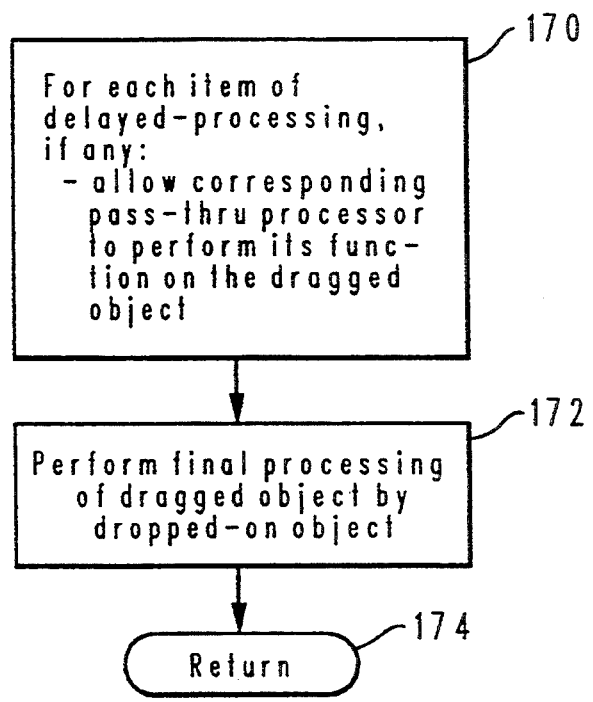

Turning to FIG. 12, a flow diagram is shown for performing delayed processing using the invention. At block 170, the following actions are taken for each item awaiting delayed processing. The corresponding pass-through processor for an item is allowed to perform its function on the dragged object. After the information is completed for all items utilizing delayed processing, the procedure moves to block 172 where final pass-through processing of dragged object is performed and a return is executed at block 174.

Figure 13:
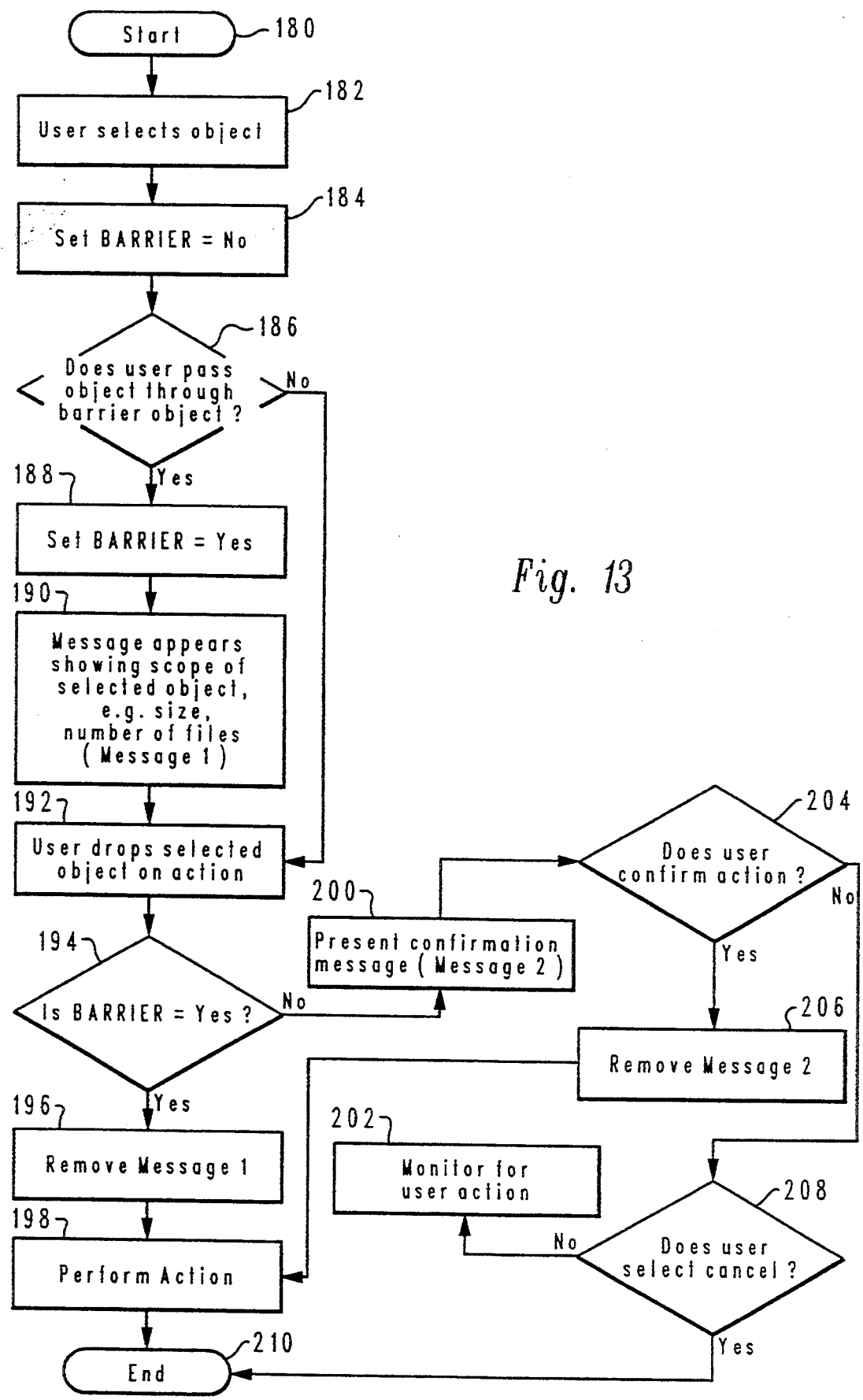

Turning now to FIG. 13, a procedure is described for using pass-through processing to suppress unwanted messages. The procedure starts at block 180 and proceeds to block 182 where a user selects a source object. At block 184, the barrier value is set equal to NO. The system conducts a query at block 186 to determine if the user has passed the source object through the barrier object. If yes, the set barrier value is set to equal YES as shown in block 188. At block 190, a message appears showing the scope of the selected object such as the size of a file, or the number of files undergoing processing. The user drops the selected object on an action object at block 192 and the system determines if the barrier values equal YES, at block 194. If the values are YES, the messages are removed as shown in block 196 and the action is performed as indicated in block 198. Returning to block 186, if the user has not passed the object through a barrier object, processing continues to block 192 where the user drops the selected source object on the target object. At block 194, if the barrier is not set to YES, then a confirmation message is presented at block 200. At block 204, the system checks to see if the user has confirmed the action. User confirmation causes the message to be removed in block 206 and the action performed in block 198. Else, processing continues to block 208 where the system checks to see if the user has canceled the selected action. Cancelation of the selected action causes the procedure to end at block 210. Else, the system goes into a monitoring state at block 202 awaiting user action.

The direct manipulation actions of the present invention can best be understood by taking specific examples through the logic of FIGS. 8–13. As a first example, assume that a user has created a work desk including note 60, clock 64 and out-basket 40 of FIG. 5. Data processing system 10 is initially in a monitoring state as indicated at block 90 of FIG. 8. The user moves pointer 19 of FIG. 1 across the work desk, positions it above note 60, clicks mouse button two and begins dragging the object toward the clock 64. Data processing system 10 detects the mouse button two drag operation as shown in FIG. 8 at block 102 and pass-through processing is performed as shown in block 112. Returning to FIG. 5, as note 60 passes over clock 64, data processing system 10 moves to block 144 of FIG. 11 where the system detects the drag-over operation. A DDE conversation is initiated at block 146 and the system checks at block 148 to determine if the dragged-over object is a pass-through processor. After verifying that it is, processing continues at block 160 to record information about the pass-through processor for processing when the dragged object is dropped.

In this particular example, the pass-through processor for clock 64 adds a specific time for delivery of note 64. The drag operation ends when note 64 is dropped on out-basket 40. This causes processing to proceed through block 142 to block 154 of FIG. 11 where the drop is detected. Control is subsequently passed to block 156 and delayed processing is performed based on the information recorded in block 160. For this example, the source object has passed through only one intervening pass-through processor (i.e., clock 64). System control now passes to block 170 of FIG. 12 where the pass-through processor is allowed to perform its function which, in this instance, causes a dialog to be posted for time entry. After the user enters the delivery time for note 60 and presses the <OK> button 70, control passes to block 172. The delivery mechanism for out-basket 40 then assumes control and note 60 is queued for delivery at the specified time.

Enabling or disabling the pass-through processor is accomplished by making the appropriate changes to objects via their properties window in a manner similar to that used in the IBM OS/2 Version 2.0 product. For the particular example, changes to the pass-through processor which adds a specific delivery time are accomplished by placing the pointer 19 over the clock 64 object of FIG. 5 and performing a mouse button two click on the object. This causes the monitoring procedure of FIG. 8 to advance through blocks 90, 92, 94 to block 106 where standard pop-up menu processing is performed. The system proceeds to FIG. 9 and at block 120 checks to see if the open/view properties have been selected. After verification, the properties notebook window is opened. The system at block 124 checks to see if the pass-through properties notebook page has been selected and control passes to block 126 where the pass-through properties are processed. This causes control to be transferred to block 134 of FIG. 10 where the user may disable/enable the "act-as-pass-through processor check box". If the user wishes the above described actions to occur, checking the enable button for the check box would be appropriate. On the other hand, if the user wishes no action when note 60 passes over clock 64 of FIG. 5, then the "disable" button would be checked. Access to properties of note 60 may be accessed in the above described manner. When accessed, the user may enable/disable the check box that permits the object to be handled by the pass-through processor. In either case, after making the appropriate changes to the properties window, the user is given the option at block 136 of requesting HELP. This will cause another window to appear, at block 138, containing a prose description of the functions performed within the window.

A second example will now be described to further illuminate the invention. This example will illustrate how the invention may be used by an experienced user to suppress unwanted messages. With particular reference to FIG. 2, a barrier object in the form of a Block Message 48 object is created on the work desk. In addition, print manager 46 and out-basket 40 are visible on the work desk. If the user wants to print the entire contents of out-basket 40 without displaying any confirmation messages (i.e., Note 1 has been printed; Note 2 has been printed, etc), the user drags out-basket 40 over Block Message 48 barrier object and drops it on print manager 46. This results in the suppression of all confirmation messages that would result from the print operation. With reference to FIG. 13, the user selects the source object at block 182 by moving pointer 19 to out-basket 40. We assume that the barrier object preventing confirmation messages is initially set to NO as shown in block 184. As the user drags out-basket 40 over/through the Block Message 48 barrier, control proceeds to block 186 where the system detects the drag over operation. The user is allowed to set the Block Message 48 barrier object to YES to block the messages. As out-basket 40 passes over barrier icon (Block Message 48), the system may optionally present a message showing the scope of the selected object such as the size, or number of files, etc. as shown at block 190. The user drops out-basket 40 on the print manager 46 as shown at block 192 to print the contents of out-basket 40. Upon dropping the source object on the target object, the earlier message may be removed as shown in block 196. The actual printing of the contents of the out-basket are carried out as shown in block 198 without the display of any confirmation messages. The system may optionally present a single confirmation message as shown in FIG. 3 where the target object (print manager 46) is shown over-layered with a displayed message 54.

In summary, the invention provides a method and apparatus for eliminating the limitations of current graphical user interfaces resulting from the simplistic semantics created by interface designers. A user does not have to accept standard actions when dropping an object on another object. Instead, the user may augment/modify the standard operations to describe in definite terms what the direct manipulation operation should do. The invention is directed to the creation and intervention of intermediate processor objects. A user while dragging a source object, may pass the source object through one or more intervening processor objects causing an appropriate action to occur to the source when it is dropped on the target object. Users may disable/enable the intervening objects so that passage of the source object creates no operations on the source object. Those skilled in the art will recognize that the appearance of the source object may be changed as it passes over an intervening object to show that it has undergone modification. This feedback may be in the form of appearance changes, color changes, flashing the source or intervening object or posting numbers. It should be apparent that the changes to the source object are transient, existing only for the duration of the direct manipulation activity. Using the invention, a user may describe in more definite terms Just what the direct manipulation operation is to do. Time consuming intermediate steps are eliminated, allowing the user to perform more exacting drag-and-drop operations while retaining the ease-of-use and metaphorical power of direct manipulation.

While the invention has been particularly shown and described with reference to preferred embodiments thereof, it will be understood by those skilled in the art that various changes in form and details may be made therein without departing from the spirit and scope of the invention.

What I claim is:

1. A computer implemented method of enhancing a standard direct manipulation drag and drop operation in a data processing system, the method comprising the steps of:
   providing a processor object potentially providing a series of changes for a source object;
   dragging said source object over said processor object while performing said standard direct manipulation drag and drop operation in said data processing system and dropping said source object on a target object; and
   processing said series of changes by said processor object for said source object in response to dropping said source object on said target object.

2. The method of claim 1 wherein said dragging step includes changing an appearance of said source object as it passes over said processor object to indicate said series of changes to said source object.

3. The method of claim 1 wherein said processor object is prevented from changing said source object by disabling said processor object during a standard drag and drop operation.

4. A method of claim 1 wherein said source object represents a note object and said target object is a repository for delivering said source object to an interconnected data processing system and where said processor object contains changes for adding a specific time to said source object.

5. A method of claim 1 wherein said source object represents a file to be edited and said target object represents a printer and wherein the processor object contains edit changes for said file which are processed when said source object is dropped on said target object.

6. An apparatus for augmenting standard direct manipulation operations, the operations displayed on a work desk containing a plurality of source objects and target objects, wherein said standard direct manipulation operations are accomplished by dragging a selected one of said source objects over to and dropping said selected one of source object on a selected one of said target objects, the apparatus comprising:
   means for providing at least one processor object potentially providing a series of changes to be performed on said selected one of said source objects;
   means for dragging said selected one of said source objects across said work desk and over said at least one processor object; and
   means for dropping said selected one of said source objects on said selected one of said target objects and performing said series of changes on said selected one of said source objects in response to dropping said selected one of said source objects on said selected one of said target objects.

7. An apparatus as recited in claim 6, wherein said means for providing at least one processor object includes means for disabling said means for providing at least one processor object during said standard direct manipulation operations.

8. An apparatus as recited in claim 6, wherein said means for dragging includes means for changing an appearance of said selected one of said source objects as it is detected by said means for providing at least one processor object.

9. The apparatus as recited in claim 7, wherein said means for providing at least one processor object is disabled by changing a value in a view of the attributes of the means for providing at least one processor object.

* * * * *